April 2, 1946.　　　　J. L. ROOF　　　　2,397,810
METAL HEATING OR MELTING FURNACE
Filed Nov. 30, 1944　　　3 Sheets-Sheet 1
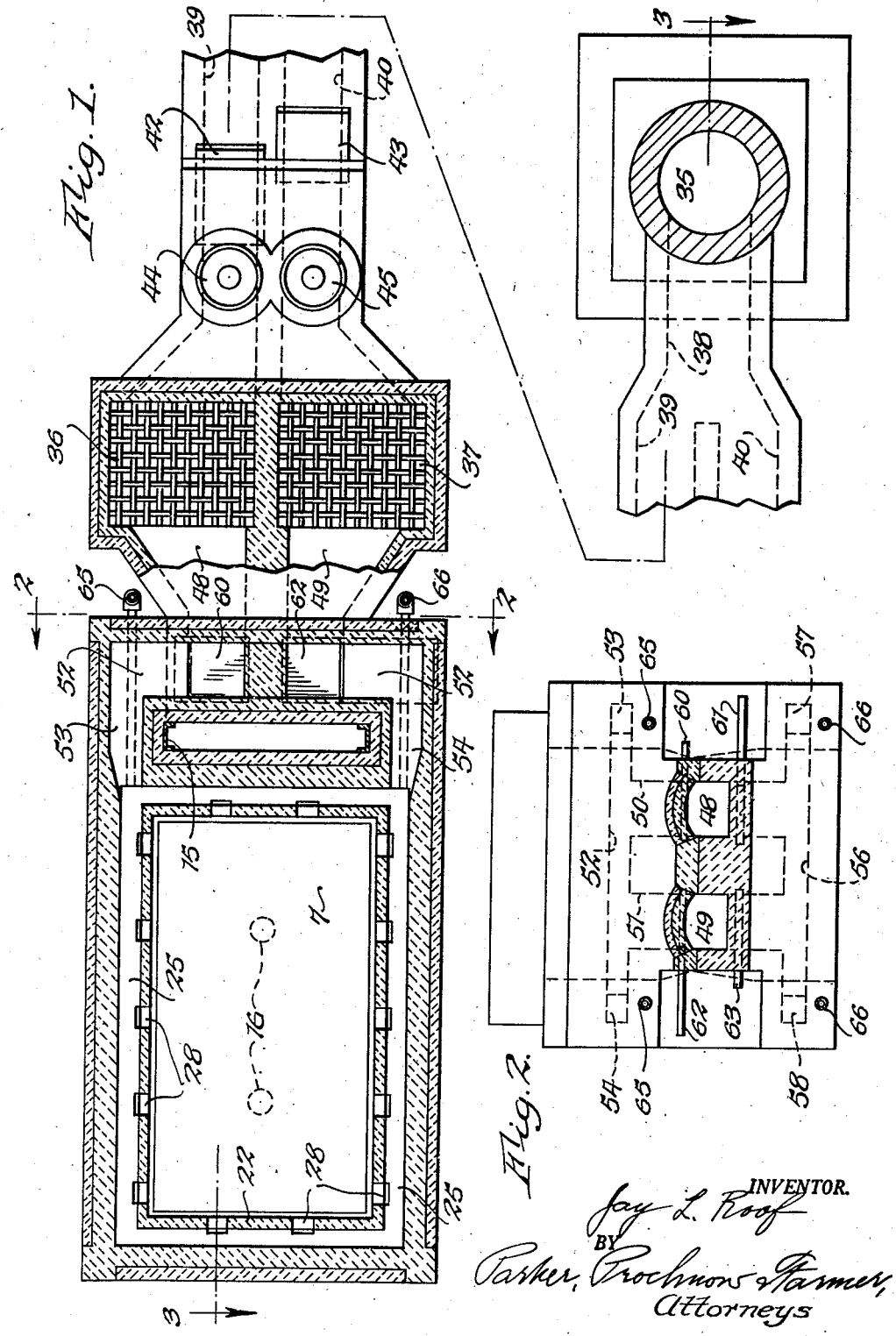

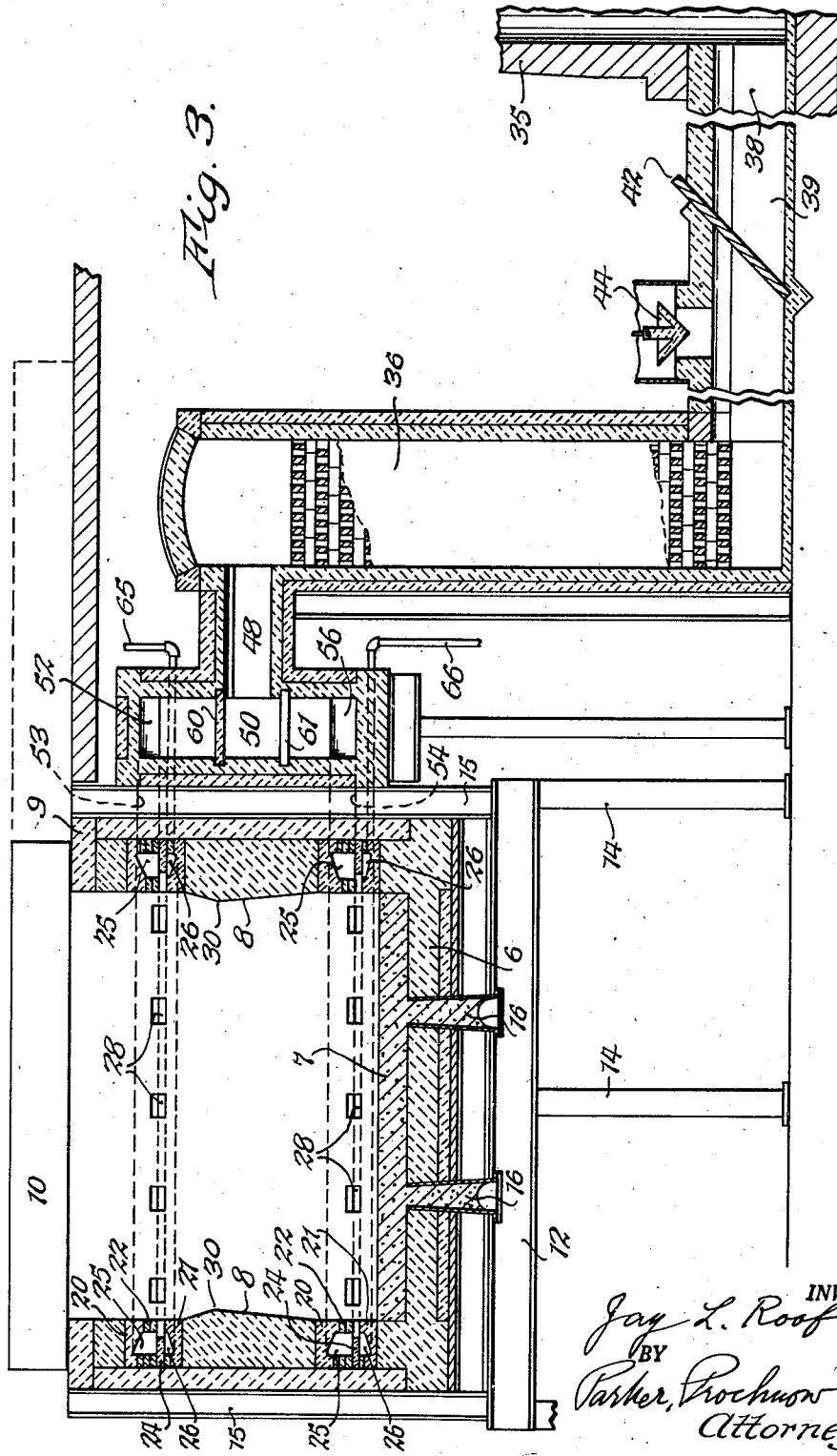

April 2, 1946. J. L. ROOF 2,397,810
METAL HEATING OR MELTING FURNACE
Filed Nov. 30, 1944 3 Sheets-Sheet 3
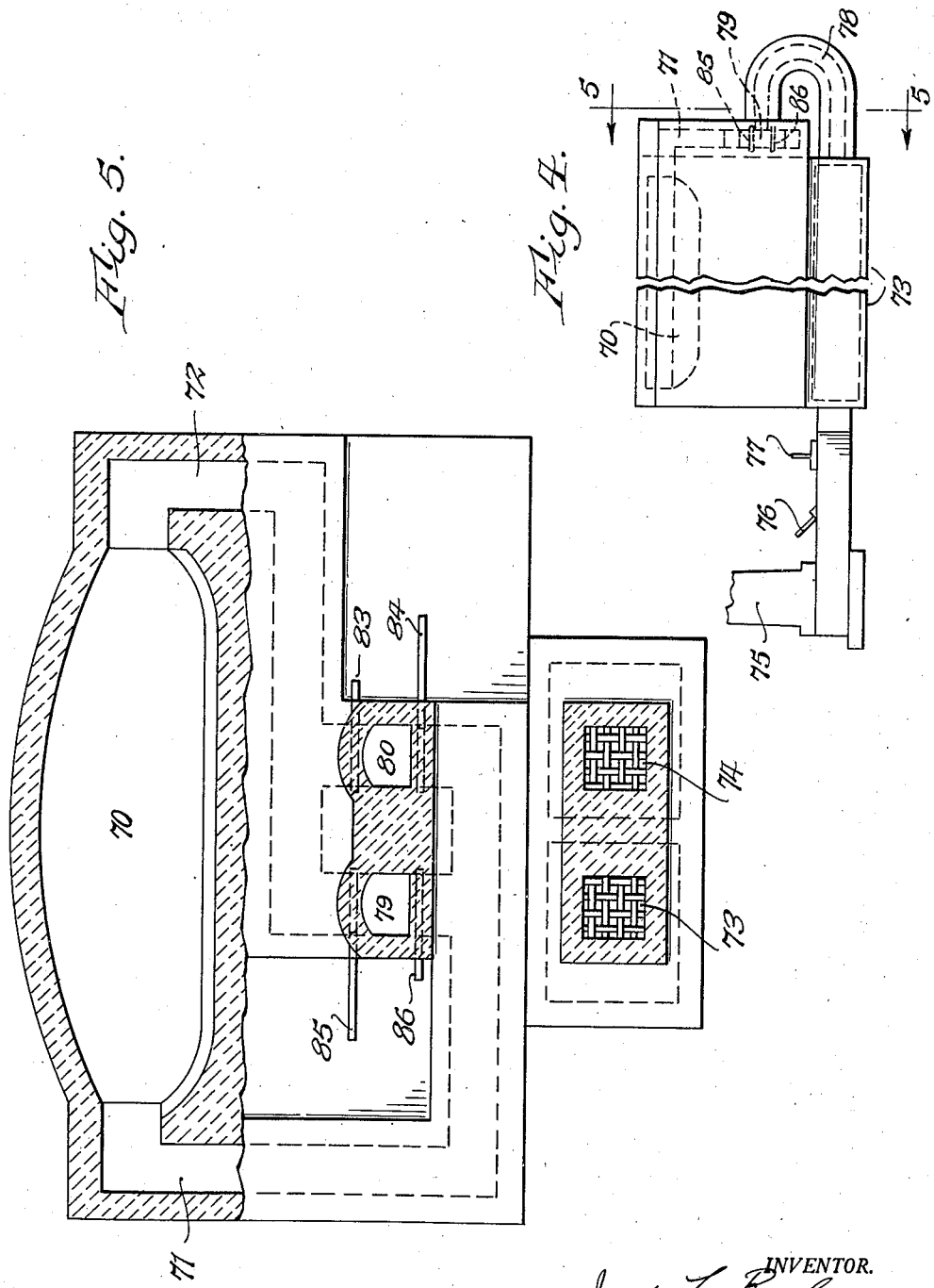
INVENTOR.
Jay L. Roof
BY Parker, Crochmow & Farmer
Attorneys Patented Apr. 2, 1946

2,397,810

UNITED STATES PATENT OFFICE 2,397,810

METAL HEATING OR MELTING FURNACE

Jay L. Roof, Hamburg, N. Y.

Application November 30, 1944, Serial No. 565,866

11 Claims. (Cl. 263—15)

This invention relates to soaking pits, melting or heating furnaces which are used for the heating and melting of steel and other metal prior to further processing of the same.

One of the objects of this invention is to provide an improved furnace in which the metal is more uniformly and completely heated in a shorter period of time than has been possible with furnaces as heretofore constructed. A further object is to provide a furnace in which the source of heated air may be instantly changed from one regenerator to another and in which the heated air may be directed to one or another burner or set of burners, so that the flow of air and products of combustion to and from the regenerators can be changed or reversed without changing the direction of flow of heated air into the furnace. Another object of this invention is to provide a furnace which is readily adaptable for use either with recuperators or regenerators for heating incoming air.

It is also an object of this invention to provide a soaking pit or ingot heating furnace with a plurality of fuel and air discharge openings or burners located at different levels of the furnace, so that different portions of the ingot in the furnace may be subjected to the direct heat of the flame at different times, to supply different portions of the ingots with approximately the same amount of heat.

A further object of this invention is to provide a soaking pit of improved construction in which the air and fuel supplied to the burners of the soaking pit passes through conduits in or attached to the upright walls of the pit for the twofold purpose of increasing the temperature of the air and fuel by recovering heat from the wall of the soaking pit. A further object is to provide a soaking pit with ducts or burners of improved construction formed in or attached to the walls thereof in which the air and gas are mixed and discharged to the interior of the pit.

It is also an object of this invention to provide an improved method of operating metal heating furnaces in conjunction with regenerators to provide more rapid and efficient heating of the metal.

Other objects and advantages of this invention will appear from the following description and claims.

In the accompanying drawings:

Fig. 1 is a sectional plan view of a soaking pit or furnace and the parts pertaining thereto embodying this invention.

Fig. 2 is a transverse sectional elevation thereof, on line 2—2, Fig. 1.

Fig. 3 is a fragmentary longitudinal sectional elevation thereof, on line 3—3, Fig. 1.

Fig. 4 is an elevation of an open hearth furnace having improvements embodying this invention applied thereto.

Fig. 5 is an enlarged elevation thereof, partly in section, on line 5—5, Fig. 4.

I have shown my invention as applied to a soaking pit or furnace for heating ingots prior to rolling or otherwise further processing the same, and to an open hearth furnace for melting iron and other ingredients for making steel, but it will be understood that it is not intended to limit this invention to use in connection with the two types of furnaces shown, since it will be obvious that my improvements may be applied to other types of furnaces.

The soaking pit or furnace shown in Figs. 1 to 3 includes a floor or base 6 on which the usual bed of bottom making material may be supported on which the ingots may stand in upright positions, and 8 represents the upright wall of the soaking pit which encloses the soaking pit and terminates at its upper end in a coping 9 on which a cover 10 of any suitable or standard design may rest, the cover being removable by a crane or cover operating mechanism (not shown) to obtain access to the interior of the soaking pit. The pit shown in the drawings is of a rectangular form, but it will be understood that my invention may equally well be applied to square, circular or ony other type of soaking pit.

The soaking pit may be supported in any usual or suitable manner, for example, by means of a suitable frame structure or foundation including beams 12 and upright pillars or posts 14 and the wall of the soaking pit may also be reinforced by means of upright structural members or beams 15. 16 represents suitable clean-out holes by means of which the bottom material and scale may be removed from the soaking pit, these clean-out holes being closed by any conventional means such as plates or bell-shaped cones secured to the bottoms thereof, as shown in Fig. 3.

One of the features of this invention is the provision of one or more conduits or passages through which the air for combustion of the fuel passes, for the purpose of raising the temperature of this air by contact with the hot wall of the soaking pit, and preferably a similar conduit or passage is also provided for the fuel. For this purpose, in the particular construction shown, a horizontal zone of the wall is constructed in such a manner as to provide this hollow space or tunnel, which preferably extends continuously around the entire wall so as to form an endless conduit or hollow space. In the construction shown, see particularly Fig. 3, two such hollow spaces or tunnels are provided, one located materially above the other, but it will be understood that only one such hollow zone in the peripheral wall may be provided, or if desired, more than two hollow zones or conduits may be provided. In the construction shown for this purpose, I construct a portion of the wall in a horizontal zone thereof with brick or blocks 20 and 21, the lower block 21 being of U-shape and the upper block 20 being of inverted U-shape so that these two blocks between them form a hollow space. The two blocks 20 and 21 may lie in contact with each other or they may be separated by means of brick 22 to produce a hollow space of larger size. It is also possible in accordance with my invention to divide this space formed by the blocks and brick into two conduits by a suitable partition or dividing wall, which may be formed by slabs or brick 24 extending crosswise of the space. In the construction shown, this partition of slabs or brick forms a relatively large air conduit 25 and a smaller gas or fuel conduit 26. Since these conduits are embedded or built into the upright wall 8 of the soaking pit, it will be obvious that gas or air flowing in these conduits will be heated by the heat of the walls and thus increase the efficiency of the combustion. Conduits or tubes not embedded in the wall of the furnace may, however, be employed, if desired.

It is also an important feature of this invention to provide the conduits with discharge outlets or burners at frequent intervals so that all portions of the interior of the soaking pit will be heated to substantially the same extent. For this purpose, the conduits 25 and 26 are connected with the interior of the soaking pit by means of a plurality of inwardly extending ducts or burners 28 which may be formed by merely omitting a portion of the partition wall between the two conduits, as clearly shown in Fig. 3, or by making portions of the partition or dividing wall 24 opposite the ducts 28 of less width so that an opening is formed extending from the conduits to the inner surface of the wall 8. Consequently, air from the conduit 25 and fuel from the conduit 26 may pass outwardly through the openings which form the ducts or burners 28. The air and gas become mixed while flowing through the same. By means of this construction, efficient burners are provided, and as shown in Figs. 1 and 3, these ducts 28 are preferably arranged at intervals along the entire upright peripheral wall of the soaking pit, so that air and fuel from the conduits are discharged in a number of different locations within the soaking pit so that all portions of the pit will be substantially equally heated. Burners of any other construction connected with the air and gas conduits may be provided, if desired.

In order to protect the burners from damage by ingots, the peripheral wall 8 is preferably provided with an inwardly extending projection 30 which will serve to space the ingots from the wall when they are lowered into the pit or lifted out of the same, so that they will stand on the bottom material without damaging the burners or without obstructing the passage of flame out of the burners or ducts 28. This projection also causes the ingots to be spaced from the wall of the furnace so that burning fuel may travel upwardly or downwardly on all sides of the ingots to heat them uniformly.

It will be noted that in the construction shown in Fig. 3, one zone or group of burners is arranged at a much higher elevation than the other and either zone or group may be employed for projecting fuel and air into the pit, and in such case, the other conduits will serve to carry away the products of combustion, the air conduits being made sufficiently large so that they may be used either for carrying air to the burners or for conducting products of combustion from the soaking pit. The provision of two or more zones or groups of burners makes it possible to apply heat to different portions of the ingots standing upright in the pit. Heretofore burners were provided only at one elevation, and consequently, some portions of the ingots would be heated more rapidly than others, and it was, consequently, necessary after heating the ingots to retain them in the pit for a substantial period of time in order to allow the heat to soak uniformly through all parts of the ingots, since it is necessary that the ingots be of substantially uniform temperature in all parts thereof when they were passed to the rolls. By means of the construction herein shown, the ingots may be heated for a period of time by means of the lower burners or ducts and the flow of air and fuel may then be reversed so that the fuel and air is discharged only through the upper series of burners or ducts, thus applying heat more directly to different portions of the ingots, which materially reduces the time required to uniformly heat the ingots by materially reducing or entirely eliminating the soaking time.

In order to make this arrangement possible, I have provided valves for controlling the flow of air, fuel and products of combustion through either the upper or lower conduits. In the construction shown by way of example, 35 represents a chimney or smoke stack for the products of combustion. The ingot heating furnace or soaking pit shown may be employed either with a recuperator or heat exchanger for heating the air passing to the ingot heating furnace or the air may be heated by means of two or more regenerators, and I have shown in the drawings, two regenerators 36 and 37 for this purpose. The chimney or stack 35 terminates at its lower end in a substantially horizontal passage 38 which connects with two separate passages 39 and 40, the passage 39 leading to the regenerator 36 and the passage 40 leading to the other regenerator 37. Valves 42 and 43 are provided in the passages 39 and 40. Either of those valves may be opened to connect its passages with the stack 35 and which when closed, will interrupt the flow of products of combustion to the stack. The ducts or passages 39 and 40 are also provided with air inlet valves 44 and 45 which are located between the regenerators and the stack valves 42 and 43. The valves 44 and 45, as clearly shown in Fig. 1, admit outside air to the passages 39 and 40. Consequently, when air is heated in the regenerator 36, the stack valve 42 will be closed and the air valve 44 will be opened. At the same time, products of combustion will be discharged through the flue passage 40, so that the air valve 45 will be closed and the stack valve 43 opened. This will permit air to enter the valve 44 and pass to the regenerator 36 for heating the same and products of combustion from the other regenerator 37 will pass the open valve 43 and enter the smoke stack or chimney 35. Valves of any suitable kind may be provided for this purpose.

The regenerator 36 is provided near the upper end thereof with a passage 48 and the other regenerator 37 is provided with a similar passage 49 and these two passages lead into upright ducts 50 and 51 respectively, see Fig. 2. The upper ends of the upright ducts and passages 50 and 51 terminate in an upper horizontal passage 52, which has branch passages 53 and 54 at opposite ends thereof leading to opposite sides of the upper air ducts 25 of the ingot heating furnace. The lower ends of the upright ducts or passages 50 or 51 terminate in a lower horizontal passage 56, the opposite ends of which are connected with branch ducts 57 and 58 leading to opposite sides of the lower duct 25 of the furnace.

In order to control the flow of air either to the upper air conduit 25 or to the lower one, I provide a pair of valves in each of the upright passages 50 and 51. The upright passage 50 has a valve 60 located above the connecting conduit 48 which when open establishes communication with the upper horizontal passage 52. A lower valve 61 arranged below the connecting duct 48 serves to establish and interrupt communication between this conduit and the lower horizontal passage 56 leading to the lower air conduit 25 of the furnace. Similarly valves 62 and 63 are provided in the upright conduit 51 for connecting the conduit 49 with either the upper or lower conduits 25 of the furnace.

Fuel may be admitted to the fuel conduits 26 of the furnace in any suitable or desired manner, and in the construction shown, fuel supply pipes 65 and 66 are provided, the pipes 65 conducting fuel to the upper fuel conduit 26 in the wall of the furnace and the pipes 66 conducting fuel to the lower fuel conduit 26 of the furnace. These pipes 65 and 66 may be controlled by valves of any suitable or desired type (not shown) for supplying fuel to either fuel supply conduit of the furnace. A pair of fuel supply pipes is preferably provided for supplying fuel to opposite sides of each fuel conduit 26 of the furnace, but a single pipe may be provided for each conduit, if desired.

The valves are shown in the drawings as set for admitting heated air from the upper end of the regenerator 36 to the lower air ducts 25 of the furnace and for discharging products of combustion from the upper air duct 25 of the furnace to the other regenerator 49, after which the products of combustion are discharged from the lower end of this regenerator to the chimney 35. As shown in Fig. 2, hot air entering the connecting passage 48 passes through the lower open valve 61 to the lower horizontal passage 56 leading to the passages 57 and 58 to the lower conduit 25 of the furnace. Products of combustion from the upper conduit 25 pass into the upright passage 51 and through the open valve 62 to the passage 49 leading to the recuperator 37, and thence from the lower end of this recuperator past the closed air valve 45 and through the open smoke stack valve 43 into the chimney. It will be obvious that by closing the valves 61 and 62 and opening the valves 60 and 63, the flow of air to the furnace will be reversed, so that hot air is admitted to the upper conduit 25 of the furnace without changing from one regenerator to the other. When it is desired to change regenerators, the stack valve 42 is opened and the stack valve 43 closed, the air valve 44 closed and gas shut off, then the air valve 45 opened and the valves 60, 61, 62 and 63 are adjusted accordingly and gas turned on. It is consequently, possible to change from the upper zone of burners in the furnace to the lower one and vice versa without changing the regenerators, and it is also possible to change regenerators without changing the flame from one set of burners to the other. The apparatus described is, therefore, capable of being used as may be desired by the operator to heat the material in the furnace. It will also be obvious that some of the heat in the wall of the furnace will be transferred to the hot air flowing in the conduits 25 of the furnace so as to increase the temperature of the air supplied to the furnace, and thus improve the efficiency of the combustion as well as keeping the furnace wall from becoming excessively hot. By alternately using one conduit for incoming air and the other for carrying off products of combustion, the conduits act as regenerators, absorbing heat from the products of combustion and then giving off heat to the incoming air.

While I have shown in the drawings two sets of air and fuel conduits in the wall of the furnace or pit, it will be obvious that more than two sets may be provided. Also only one set of air and fuel conduits may be employed, if desired, in which case, other means may be provided for withdrawing the products of combustion from the furnace, such, for example, as a hollow space or tunnel in the wall in which the partition 24 is omitted, or through a separate conduit or flue attached to the furnace structure. Such structure does not require all of the valves herein shown, and has the advantage that flame may be provided at intervals about the wall 8, so that the interior of the furnace or pit is uniformly heated in all portions thereof.

When a single recuperator or heat exchanger is employed in place of the two regenerators, the heated air from the recuperator may flow continuously through one of the connecting passages 48 and 49, and the products of combustion will then flow through the other of these two passages, since products of combustion flow continuously through the same passages of the recuperator and incoming air through other passages. In that case, only one passage leading to the chimney or stack is employed and a single air inlet to the recuperator. The same valves 60, 61, 62 and 63 could then be used for directing the air and products of combustion so that either set of burners may be used for supplying heat to the contents of the furnace. Since the construction of recuperators is well known, it is not deemed necessary to illustrate the use of the same in the drawings.

By means of the construction shown, the furnace or pit may be fired from the top zone of burners for a period of time with the flame passing downwardly to the lower zone of burners, thus applying more heat to the upper portions of the ingots and after a period of time the flame may be changed to the lower zone and pass upwardly to the upper zone. This results in heating the ingots more uniformly during the complete heating cycle and avoids stresses in the metal due to unequal heating. By means of the construction described, both regenerators may be arranged at the same side or end of the furnace, and may be spaced as far from or as near to the furnace as may be desired, thus making the installation of my improved furnace or pit more adaptable to various installations, as well as permitting more heating space than is now available. The furnace requires materially less time to heat ingots than with prior furnaces or soaking pits because heat may be applied to different parts of the ingots or metal to be heated, so that the usual soaking time may be eliminated or greatly reduced. The provision of a plurality of burners in each series or group has the advantage that the heat is distributed over a relatively large space so that there is no excessive concentration of heat in certain parts of the furnace. This results in a more uniform heating of all of the contents of the furnace and also prevents overheating and rapid deterioration of certain parts of the furnace wall so that the life of the furnace or soaking pit is correspondingly increased. My improved furnaces or pits are also less expensive to install, construct and maintain because the valve arrangement is all concentrated in one location.

By providing burners at intervals around the wall of the furnace and approximately at the same level, a substantially complete blanket of flame is provided throughout the furnace, from which the products of combustion are discharged through openings at a different level, so that an exceptionally uniform distribution of heat in all parts of the furnace results, and the vertical flow of flame and heat from the burners to the discharge passages for the products of combustion, imparts heat to a considerable portion lengthwise of each ingot, so that a more uniform heating of the ingots results than in cases where the heat flow is in a substantially horizontal direction.

In Figs. 4 and 5, I have shown my invention applied to an open hearth furnace. These furnaces have heretofore been constructed so that the change in the direction of the flame in the furnace could only be effected with a simultaneous change from one regenerator to the other. It is generally advisable to reverse the flow through the regenerators at more or less regular intervals of time, and this time generally does not coincide with the most desirable time intervals for reversing the passage of flame in the furnace. In applying my invention to an open hearth furnace, I supply the burners at opposite sides of the furnace fuel and air in such a manner that the flame can be alternately changed from one burner to the other without changing or reversing the flow in the regenerators, and so that the flow through the regenerators can be reversed without changing the flow through the furnace.

In the drawings, 70 represents an open hearth furnace having passages 71 and 72 leading to ports opening into the furnace, so that fuel and heated air may be admitted to the furnace through either passage 71 or 72 and the hot products of combustion withdrawn through the opposite passage. 73 and 74 represent regenerators which in the particular construction illustrated are arranged below the furnace structure, 75, Fig. 4, represents a flue with which the regenerators are connected by means of passages controlled by a smoke duct valve 76 and air valves 77 which may be similar to those shown in Figs. 1 to 3. The regenerators may be connected in any suitable or desired manner, for example, by means of ducts 78 to valve controlled passages 79 and 80 similar to the passages 50 and 51 shown in Fig. 2. Both of these valve controlled passages communicate with the duct or passage 72 leading to one side of the furnace and with the passage 71 leading to the other side of the furnace, and valves 83, 84, 85 and 86 control the flow of hot air and products of combustion to and from the furnace and the regenerators.

The method of operating this furnace is the same as that described in connection with the construction shown in Figs. 1 to 3, and it will be obvious that the valves 83 to 86 may be operated in such a manner that the hot air from either end of the furnace and the products of combustion from the furnace may be discharged to either regenerator. Consequently, it is possible to change the direction of the flame in the furnace without changing regenerators, and to change regenerators without changing the direction of the flame so that this valve arrangement lends itself to any desired operation of the furnace. The passages 71 and 72 may each terminate in one or more burners in the furnace.

In both of the constructions shown in the drawings, it will be obvious that all of the valves may be automatically operated either through the medium of heat control devices or by a manually controlled and power-operated system, and since such systems for operating valves are well known, they are not herein illustrated. I have also not shown in Figs. 4 and 5 the tubes or passages for conducting the fuel to the furnace since this may be effected by means similar to those heretofore employed, or by any other suitable means, and if the fuel is to be heated before admission to the furnace, two additional regenerators for the fuel may be provided.

I claim as my invention:

1. A metal heating furnace having burners located in different portions of the furnace through which fluid fuel and heated air may be admitted, stationary regenerators through which products of combustion and air for combustion may be alternately passed, passages connecting both of said regenerators with both of said burners, and valves for controlling the flow of fluid in said passages to admit heated air from either regenerator to either of said burners and to discharge products of combustion from either burner to either regenerator.

2. A metal heating furnace having burners located in different portions of the furnace through which fluid fuel and heated air may be admitted, stationary regenerators through which products of combustion and air for combustion may be alternately passed, passages connecting both of said regenerators with both of said burners, a passage leading from one of said burners, a second passage leading from the other burner, and passages from said regenerators and each of which may be placed at will into communication with either the first mentioned passage or the second passage.

3. A metal heating furnace having burners located in different portions of the furnace through which fluid fuel and heated air may be admitted, stationary regenerators through which products of combustion and air for combustion may be alternately passed, passages connecting both of said regenerators with both of said burners, a passage leading from one of said burners, a second passage leading from the other burner, passages from said regenerators, and a pair of valves in each of said last mentioned passages, one of said valves when open establishing communication with said first mentioned passage, and the other valve when open establishing communication with said second passage.

4. A metal heating furnace having burners located in different portions of the furnace through which fluid fuel and heated air may be admitted, stationary regenerators through which products of combustion and air for combustion may be alternately passed, passages connecting both of said regenerators with both of said burners, valves for controlling the flow of fluid in said passages to admit heated air from either regenerator to either of said burners and to discharge products of combustion from either burner to either regenerator, a duct leading from each regenerator to a discharge for products of combustion and each having an air inlet opening, and valve means in each duct for admitting air to said duct and for connecting said duct with said discharge.

5. A method of operating a furnace having two burners which may be used alternately to admit fuel and to withdraw products of combustion from said furnace in conjunction with a pair of stationary regenerators, which includes reversing the flow of fuel to the burners without reversing the flow of fluid in said regenerators, and reversing the flow of fluid in said regenerators without reversing the flow of fuel in said burners.

6. A method of operating an ingot heating furnace having two substantially horizontal series of burners arranged one in the upper portion and one in the lower portion of the furnace, in conjunction with a pair of regenerators, which includes alternately admitting fuel and air from one regenerator to each series of burners and discharging products of combustion from the other series of burners to a regenerator, and reversing the flow of air and products of combustion in said regenerators without reversing said series of burners.

7. A furnace for heating metal ingots while in vertical positions, having a peripheral wall, an upper burner for heating the upper portions of said ingots, a lower burner for heating the lower portions of said ingots, both burners being formed to withdraw products of combustion from said furnace, and means for controlling the flow of products of combustion to supply fuel to either burner and to withdraw products of combustion from the other burner.

8. A furnace for heating metal ingots and having a peripheral wall, a pair of conduits in said wall adjacent to each other and separated by a partition extending to the inner surface of said wall, means for supplying air to one of said conduits, means for supplying fuel to the other of said conduits, and a series of ducts extending inwardly from the inner surface of said wall in horizontal alinement with said partition and formed by omitting a part of said partition, to cause said ducts to connect with both of said conduits to receive a mixture of air and fuel from said conduits for combustion in said furnace.

9. A furnace for heating ingots and having an upright peripheral wall, a portion of said wall extending lengthwise about the same being hollow, separating means extending across said hollow portion for dividing said hollow portion into two conduits, means for supplying air to one of said conduits, means for supplying fuel to the other conduit, a plurality of ducts spaced at intervals about said wall and extending from the inner surface thereof to said conduits for receiving both air and fuel to form a series of flames in the interior of said furnace.

10. An ingot heating furnace in which the ingots are arranged in vertical positions and having a peripheral wall, a plurality of burner openings in said wall which are spaced at intervals from each other in a horizontal zone of said wall to form a substantially complete blanket of flame in said furnace, air and fuel conduits having outlets terminating in said burner openings, and means for removing products of combustion from said furnace at a different level than said burner openings.

11. A soaking pit for heating ingots and having an upright peripheral wall, said wall having a hollow portion extending completely around said wall near the lower portion thereof, another similar hollow portion arranged near the upper portion of said wall, means extending horizontally across said hollow portions to divide each hollow portion into two conduits, a plurality of ducts extending inwardly from the interior surface of said wall to said hollow portions and spaced at intervals about said wall and each connecting with two conduits of a hollow portion, and means for admitting air and fuel to either pair of conduits and for withdrawing products of combustion from at least one of the other conduits.

JAY L. ROOF.